US011834994B2

(12) United States Patent
Matsuo et al.

(10) Patent No.: US 11,834,994 B2
(45) Date of Patent: Dec. 5, 2023

(54) TURBINE VANE AND GAS TURBINE COMPRISING SAME

(71) Applicant: Mitsubishi Power, Ltd., Kanagawa (JP)

(72) Inventors: Saki Matsuo, Yokohama (JP); Satoshi Hada, Yokohama (JP); Tomoko Morikawa, Yokohama (JP); Hiroyuki Otomo, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 4 days.

(21) Appl. No.: 17/623,021

(22) PCT Filed: Aug. 6, 2020

(86) PCT No.: PCT/JP2020/030187
§ 371 (c)(1),
(2) Date: Dec. 27, 2021

(87) PCT Pub. No.: WO2021/033564
PCT Pub. Date: Feb. 25, 2021

(65) Prior Publication Data
US 2022/0268211 A1 Aug. 25, 2022

(30) Foreign Application Priority Data

Aug. 16, 2019 (JP) ................... 2019-149245

(51) Int. Cl.
*F02C 7/18* (2006.01)
*F01D 9/02* (2006.01)
(Continued)

(52) U.S. Cl.
CPC ............... *F02C 7/18* (2013.01); *F01D 5/186* (2013.01); *F01D 9/02* (2013.01); *F01D 9/065* (2013.01);
(Continued)

(58) Field of Classification Search
CPC ...... F02C 7/18; F02C 7/28; F02C 3/14; F01D 9/02; F01D 9/06; F01D 9/065;
(Continued)

(56) References Cited

U.S. PATENT DOCUMENTS 6,082,961 A 7/2000 Anderson et al.
6,887,033 B1* 5/2005 Phillips ................... F01D 5/147
415/115

(Continued)

FOREIGN PATENT DOCUMENTS

DE 10 2005 024 696 1/2006
JP 11-200807 7/1999
(Continued)

OTHER PUBLICATIONS

International Search Report dated Oct. 6, 2020 in International (PCT) Application No. PCT/JP2020/030187, with English translation.
Written Opinion of the International Searching Authority dated Oct. 6, 2020 in International (PCT) Application No. PCT/JP2020/030187, With English translation.

*Primary Examiner* — Loren C Edwards
(74) *Attorney, Agent, or Firm* — Wenderoth, Lind & Ponack, L.L.P.

(57) ABSTRACT

A turbine vane includes a blade body and a shroud. The shroud includes a gas path surface, a front end surface, a front end corner portion which is a corner portion between the gas path surface and the front end surface, a cavity defining surface which defines a cavity allowing cooling air to flow thereinto, a first air passage in which the cooling air flows, and a second air passage in which the cooling air flows. The first air passage includes a first inlet opened at the cavity defining surface and a first outlet opened at the front end corner portion. The second air passage includes a second inlet opened at the cavity defining surface and a second outlet opened at the front end surface.

18 Claims, 9 Drawing Sheets

(51) Int. Cl.
  *F01D 25/12* (2006.01)
  *F02C 3/14* (2006.01)
  *F16J 15/02* (2006.01)
  *F01D 5/18* (2006.01)
  *F01D 9/06* (2006.01)
  *F02C 7/28* (2006.01)

(52) U.S. Cl.
  CPC .............. *F01D 25/12* (2013.01); *F02C 3/14* (2013.01); *F02C 7/28* (2013.01); *F16J 15/02* (2013.01); *F05D 2220/32* (2013.01); *F05D 2240/55* (2013.01); *F05D 2240/81* (2013.01); *F05D 2260/20* (2013.01); *F05D 2260/201* (2013.01); *F05D 2260/202* (2013.01)

(58) Field of Classification Search
  CPC . F01D 25/12; F01D 5/18; F01D 5/186; F01D 5/187; F16J 15/02; F05D 2220/32; F05D 2240/55; F05D 2240/81; F05D 2260/20; F05D 2260/201; F05D 2260/202
  See application file for complete search history.

(56) References Cited

U.S. PATENT DOCUMENTS

| | | | |
|---|---|---|---|
| 8,118,554 | B1* | 2/2012 | Liang .................... F01D 9/041 416/97 R |
| 2007/0134089 | A1 | 6/2007 | Lee et al. |
| 2015/0125310 | A1 | 5/2015 | Tagawa et al. |
| 2016/0201472 | A1* | 7/2016 | Okajima .................. F01D 9/04 29/889.7 |
| 2017/0292397 | A1* | 10/2017 | Taniguchi ............. F01D 11/008 |
| 2021/0310360 | A1 | 10/2021 | Otomo et al. |

FOREIGN PATENT DOCUMENTS

| | | |
|---|---|---|
| JP | 2006-105076 | 4/2006 |
| JP | 2007-154902 | 6/2007 |
| JP | 2012-107628 | 6/2012 |
| JP | 2012-132461 | 7/2012 |
| JP | 2015-90108 | 5/2015 |
| JP | 2016-70082 | 5/2016 |
| JP | 2020-29852 | 2/2020 |

* cited by examiner

TURBINE VANE AND GAS TURBINE COMPRISING SAME

TECHNICAL FIELD

The present invention relates to a turbine vane and a gas turbine comprising the same.

Priority is claimed on Japanese Patent Application No. 2019-149245, filed Aug. 16, 2019, the content of which is incorporated herein by reference.

BACKGROUND ART

A gas turbine includes a compressor which generates compressed air by compressing air, a combustor which generates a combustion gas by burning fuel in the compressed air, and a turbine which is driven by the combustion gas. The turbine includes a turbine rotor which rotates about an axis, a turbine casing which covers this rotor, and a plurality of turbine vane rows. The turbine rotor includes a rotor shaft which rotates about an axis and a plurality of turbine blade rows which are attached to the rotor shaft. The plurality of turbine blade rows are arranged in an axis direction in which the axis extends. Each turbine blade row includes a plurality of turbine blades arranged in a circumferential direction with respect to the axis. The plurality of turbine vane rows are arranged in the axis direction and are attached to the inner peripheral side of the turbine casing. Each of the plurality of turbine vane rows is disposed on an axis upstream side of any one turbine blade row in the plurality of turbine blade rows. Each turbine vane row includes a plurality of turbine vanes arranged in a circumferential direction with respect to the axis.

The turbine vane includes a blade body which extends in a radial direction with respect to the axis and forms a blade profile, an inner shroud which is provided on a radial inside of the blade body, and an outer shroud which is provided on a radial outside of the blade body. The blade body of the turbine vane is disposed in a combustion gas flow path through which the combustion gas passes. The inner shroud defines an edge of the combustion gas flow path on the radial inside. The outer shroud defines an edge of the combustion gas flow path on the radial outside.

The turbine vane of the gas turbine is exposed to the high-temperature combustion gas. Therefore, the turbine vane is generally cooled by air or the like.

For example, a cooling air passage through which cooling air passes is formed in an inner shroud of a turbine vane of Patent Document 1 below. The inner shroud includes a gas path surface which faces a radial outside, an anti-gas path surface which faces a radial inside, and a front end surface which faces an axis upstream side. The gas path surface is exposed to a combustion gas. There is a probability that the front end surface is in contact with the combustion gas. On the other hand, the anti-gas path surface is in contact with compressed air from the compressor. The cooling air passage includes an inlet which is opened at the anti-gas path surface and an outlet which is opened at the front end surface. The compressed air flows as the cooling air from the inlet into the cooling air passage. This cooling air cools the gas path surface in the process of passing through this cooling air passage. This cooling air flows out of the outlet formed in the front end surface.

CITATION LIST

Patent Document

Patent Literature 1

Japanese Unexamined Patent Application, First Publication No. 2012-107628

SUMMARY OF INVENTION

Technical Problem

For the turbine vane of the gas turbine, it is preferable to effectively cool the turbine vane and decrease the usage amount of air for cooling the turbine vane as much as possible while improving the durability of the turbine vane.

Here, an object of the present invention is to provide an efficiently coolable turbine vane and a gas turbine including this turbine vane.

Solution to Problem

A turbine vane according to an aspect of the invention for achieving the above-described object includes a blade body which forms a blade profile; and a shroud which is provided at an end on a second height-direction side when there are a first height-direction side corresponding to a first side of a blade height direction of the blade body and the second height-direction side corresponding to a second side of the blade height direction. The shroud includes: a gas path surface which is directed toward the first height-direction side and is in contact with a combustion gas, a rear end surface which is directed toward an existing side of a trailing edge with respect to a leading edge of the blade body and a downstream side in a flow of the combustion gas and is located on the downstream side in relation to the blade body, a front end surface which is directed toward an upstream side opposite to the downstream side and is located on the upstream side in relation to the blade body, a pressure side end surface which connects the front end surface and the rear end surface and in which a pressure side of the blade body exists with reference to a camber line of the blade body, the pressure side end surface being located on the pressure side in relation to the blade body, a suction side end surface which connects the front end surface and the rear end surface and in which a suction side of the blade body exists with reference to the camber line of the blade body, the suction side end surface being located on the suction side in relation to the blade body, a front end corner portion which is a corner portion between the gas path surface and the front end surface, a cavity defining surface which is formed in a region surrounded by the front end surface, the rear end surface, the pressure side end surface, and the suction side end surface and defines a cavity into which cooling air flows, a first air passage in which the cooling air flows, and a second air passage in which the cooling air flows. The first air passage includes a first inlet opened at the cavity defining surface and a first outlet opened at the front end corner portion. The second air passage includes a second inlet opened at the cavity defining surface and a second outlet opened at the front end surface.

A part of the cooling air flowing into the cavity flows from the first inlet into the first air passage.

The other of the cooling air flowing into the cavity flows from the second inlet into the second air passage. The cooling air flowing into the first air passage convection-cools the upstream portion of the shroud and particularly the upstream portion of the gas path surface in the process of passing through the first air passage. The cooling air flows out into the combustion gas flow path from the first outlet formed in the front end corner portion. The cooling air flowing out into the combustion gas flow path suppresses the front end corner portion from being heated by the combustion gas by suppressing the combustion gas from reaching the front end corner portion. Further, the cooling air flowing out into the combustion gas flow path suppresses the combustion gas from flowing into the gap space between the transition piece and the shroud and decreases the temperature of the gas flowing into this gap space.

The cooling air flowing into the second air passage convection-cools the upstream portion of the shroud and particularly the periphery of the front end surface in the process of passing through the second air passage. The cooling air flows out from the second outlet formed in the front end surface to the gap space between the transition piece and the shroud. The cooling air flowing out into the gap space serves as purge air purged into the gap space and suppresses the combustion gas from flowing into the gap space between the shroud and the flange of the transition piece on the outer peripheral side in relation to the cylinder inner peripheral surface of the transition piece through the gap space between the transition piece and the shroud. As a result, it is possible to suppress the combustion gas from reaching the front end surface of the shroud facing the gap space, the rear end surface of the transition piece, and the flange of the transition piece and to suppress the front end surface of the shroud, the rear end surface of the transition piece, and the flange of the transition piece from being heated by the combustion gas. This cooling air dilutes the combustion gas flowing into the gap space and decreases the gas temperature in the gap space to suppress the heating of the front end surface of the shroud, the rear end surface of the transition piece, and the periphery of them. That is, the cooling air flowing out into the gap space serves as purge air for suppressing the combustion gas from flowing into this gap space and decreases the temperature of the atmosphere gas in the gap space by diluting the combustion gas to suppress the heating of the component having a surface defining the gap space.

Incidentally, only in one air passage in the first air passage and the second air passage, the upstream portion of the shroud can be cooled and the thermal damage in this portion can be suppressed. Here, a case in which the upstream portion of the shroud is cooled only by the first air passage will be considered. In this case, the effect of the second air passage also needs to be borne by the first air passage. Therefore, for example, the total passage cross-sectional area of the first air passage needs to be increased so that the flow rate of the cooling air flowing in the first air passage becomes higher than the total flow rate of the cooling air flowing in the first air passage and the second air passage in this aspect.

Further, a case in which the upstream portion of the shroud is cooled only by the second air passage will be considered. In this case, the effect of the first air passage also needs to be borne by the first air passage. Therefore, for example, the total passage cross-sectional area of the second air passage needs to be increased so that the flow rate of the cooling air flowing in the second air passage becomes higher than the total flow rate of the cooling air flowing in the first air passage and the second air passage in this aspect.

Thus, since the shroud of this aspect includes the first air passage and the second air passage, it is possible to effectively cool the shroud and to suppress the usage amount of the air for cooling the shroud while improving the durability of the shroud.

Here, in the turbine vane of the above-described aspect, the shroud may include a plurality of the first air passages and a plurality of the second air passages. In this case, the plurality of first air passages and the plurality of second air passages are all arranged in a lateral direction in which the pressure side end surface and the suction side end surface are arranged.

In the turbine vane of the above-described aspect including the plurality of first air passages and the plurality of second air passages, the first outlets of at least a part of the first air passages in the plurality of first air passages may be located in a region on a first lateral side with reference to the leading edge of the blade body in the front end corner portion when there are the first lateral side corresponding to a first side of the lateral direction and a second lateral side corresponding to a second side of the lateral direction. Further, the second outlets of at least a part of the second air passages in the plurality of the second air passages may be located in a region on the first lateral side with reference to the leading edge of the blade body in the front end surface. In this case, the first lateral side is a side in which the pressure side end surface is located with respect to the suction side end surface and the second lateral side is a side opposite to the first lateral side.

In the combustion gas flow path, a pressure distribution is generated in the periphery of the upstream side of the turbine vane in the lateral direction in which the plurality of turbine vanes are arranged. Specifically, in the periphery of the upstream side of the turbine vane, the pressure of the portion on the first lateral side (pressure side) with reference to the leading edge of the blade body increases and the pressure of the portion on the second lateral side (suction side) with reference to the leading edge of the blade body relatively decreases. Therefore, the combustion gas flowing in the combustion gas flow path easily flows into the gap space from the portion on the first lateral side (pressure side) in relation to the portion on the second lateral side (suction side) with reference to the leading edge of the blade body between the rear end surface of the transition piece and the front end surface of the shroud.

Therefore, the first outlets of at least a part of the first air passages in the plurality of first air passages are desirably located in a region on the first lateral side (pressure side) with reference to the leading edge of the blade body in the front end corner portion. Further, the second outlets of at least a part of the second air passages in the plurality of second air passages are desirably located in a region on the first lateral side (pressure side) with reference to the leading edge of the blade body in the front end surface.

In the turbine vane of the above-described aspect, the second outlets of the second air passages except for the at least a part in the plurality of second air passages may be located in a region on the second lateral side with reference to the leading edge of the blade body in the front end surface.

In this aspect, the second outlet of the second air passage is disposed in the region on the second lateral side with reference to the leading edge of the blade body. Thus, it is possible to suppress an increase in the amount of the combustion gas flowing into the region on the second lateral side even when the amount of the combustion gas flowing into the gap space temporarily increases in the region on the second lateral side with reference to the leading edge of the blade body due to a pressure variation or the like of the combustion gas in the periphery of the upstream side of the turbine vane.

In the turbine vane of any one of the above-described aspects including the plurality of first air passages and the plurality of second air passages, at least a part of the first air passages in the plurality of first air passages may be adjacent to any second air passage in the plurality of second air passages in the lateral direction.

In this aspect, a part of the first air passages are adjacent to the second air passages in the lateral direction and the first air passage and the second air passage are alternately arranged in the lateral direction. Thus, the convention-cooling of the front end surface and the leading edge corner portion of the shroud in the lateral direction is uniformly performed and the thermal stress of the front end surface and the leading edge corner portion of the shroud is reduced. Further, the drift of the purge air discharged from the second air passage is also suppressed and the inflow of the combustion gas into the gap space is further suppressed.

In the turbine vane of any one of the above-described aspects including the plurality of first air passages and the plurality of second air passages, in the plurality of first air passages and the plurality of second air passages, the number of one passages may be larger than the number of the other passages.

In the turbine vane of any one of the above-described aspects including the plurality of first air passages and the plurality of second air passages, the first air passage may include a first outlet side portion including the first outlet in the first air passage, and at least the first outlet side portion in the first air passage may be gradually inclined to be directed toward the first height-direction side as it goes toward the upstream side.

In this aspect, the cooling air flowing out of the first air passage is gradually directed toward the first height-direction side as it goes toward the upstream side. Thus, it is possible to effectively suppress the combustion gas from reaching the front end corner portion and to suppress the combustion gas from flowing into the gap space between the transition piece and the shroud by the cooling air flowing out of this first air passage.

In the turbine vane of the above-described aspect including the first outlet side portion, the first outlet side portion of the first air passage may be inclined to be gradually directed toward a first lateral side corresponding to a first side of the lateral direction as it goes toward the upstream side. In this case, the first lateral side is a side in which the pressure side end surface is located with respect to the suction side end surface.

In this aspect, it is possible to increase the passage length of the first air passage even when the distance between the front cavity defining surface provided with the first inlet and the front end corner portion provided with the first outlet is short.

Thus, it is possible to effectively convection-cool the upstream portion of the inner shroud by the cooling air passing through the first air passage. Further, as described above, the combustion gas flowing in the combustion gas flow path easily flows into the gap space from the portion on the first lateral side (pressure side) with reference to the leading edge of the blade body between the rear end surface of the transition piece and the front end surface of the shroud. In this aspect, since the cooling air flowing out of the first air passage is directed toward the first lateral side (pressure side) while being directed toward the upstream side, it is possible to effectively suppress the combustion gas from flowing into the gap space.

In the turbine vane of any one of the above-described aspects, the front end corner portion may include a front end slope which is inclined with respect to each of the gas path surface and the front end surface. In this case, the first outlet is opened at the front end slope.

In the turbine vane of any one of the above-described aspects, the second air passage may include a second outlet side portion including the second outlet in the second air passage, and at least the second outlet side portion of the second air passage may be gradually inclined to be directed toward the first height-direction side as it goes toward the upstream side.

The turbine vane of any one of the above-described aspects may further include a collision plate which divides the cavity into a first side cavity on the first height-direction side and a second side cavity on the second height-direction side. In this case, the collision plate may be provided with a plurality of through-holes which penetrate in the blade height direction and lead the cooling air in the second side cavity into the first side cavity. Further, at least one inlet of the first inlet and the second inlet may be opened at a surface that defines the second side cavity in the cavity defining surface.

When the cooling air flows from the second side cavity into the first side cavity through the through-hole of the collision plate, the pressure decreases and the temperature increases. Thus, when the inlet of the air passage is opened at the surface that defines the second side cavity in the cavity defining surface, it is possible to suppress a decrease in the pressure of the cooling air flowing into this air passage and to suppress an increase in the temperature of this cooling air.

In the turbine vane of the above-described aspect including the collision plate, both the first inlet and the second inlet may be opened at a surface that defines the second side cavity in the cavity defining surface.

In the turbine vane of any one of the above-described aspects, the shroud may include a front end suction side corner portion which is a corner portion between the gas path surface, the front end surface, and the suction side end surface and a third air passage in which the cooling air flows. In this case, the third air passage includes a third inlet which is opened at the cavity defining surface and a third outlet which is opened at the front end suction side corner portion.

A part of the cooling air flowing into the cavity flows from the third inlet into the third air passage.

The cooling air flowing into the third air passage convection-cools the upstream portion of the shroud and particularly the portion of the gas path surface on the upstream side and the second lateral side (suction side) and the upstream portion of the suction side end surface in the process of passing through this third air passage. The cooling air flows from the third outlet formed in the front end suction side corner portion into the combustion gas flow path. The cooling air flowing out into the combustion gas flow path serves as purge air to suppress the combustion gas from reaching the front end suction side corner portion and suppress the front end suction side corner portion from being heated by the combustion gas.

In the turbine vane of the above-described aspect including the third air passage, the front end suction side corner portion may include a front end suction side slope which is inclined with respect to each of the gas path surface, the front end surface, and the suction side end surface, and the third outlet may be opened at the front end suction side slope.

A gas turbine according to an aspect of the invention for achieving the above-described object includes: a plurality of the turbine vanes of the above-described aspect; a turbine rotor which rotates about an axis; a turbine casing which covers the turbine rotor; and a combustor which sends the combustion gas into the turbine casing from an axis upstream side in an axis direction in which the axis extends. The plurality of turbine vanes are arranged in the turbine casing. The turbine rotor includes a rotor shaft which is centered on the axis and a plurality of turbine blades which are attached to the rotor shaft. The plurality of turbine blades are arranged in a circumferential direction with respect to the axis. The plurality of turbine vanes are arranged in the circumferential direction, located on the axis upstream side in relation to the plurality of turbine blades, and are attached to the turbine casing so that the blade height direction is a radial direction with respect to the axis and the upstream side is the axis upstream side.

Here, in the gas turbine of the above-described aspect, the second height-direction side may be the radial inside with respect to the axis and the shroud may be the inner shroud provided at the end of the blade body on the radial inside.

The gas turbine of any one of the above-described aspects may include a seal which connects the combustor and the turbine vane. The combustor includes a burner which injects fuel in a direction including a directional component on an axis downstream side opposite to the axis upstream side in the axis direction and a transition piece which is formed in a cylindrical shape and forms a combustion space for burning the fuel injected from the burner. The transition piece includes a cylinder which extends in the direction including the directional component on the axis downstream side and forms the combustion space on an inner peripheral side and a flange which protrudes toward an outer peripheral side from a downstream end of the cylinder on the axis downstream side. The shroud of the turbine vane includes an upstream protrusion which protrudes toward the upstream side from a position separated from the gas path surface in the front end surface. The seal is located on the outer peripheral side in relation to an outer peripheral surface of the cylinder. The downstream end of the cylinder and the front end surface of the shroud face each other with a gap therebetween. The seal includes a transition piece connection portion which is connected to the flange of the transition piece, a turbine vane connection portion which is connected to the upstream protrusion of the turbine vane, and a cooling air passage in which cooling air flows. The cooling air passage of the seal allows a space between the downstream end of the cylinder and the front end surface of the shroud to communicate with a space on the outer peripheral side of the transition piece.

Advantageous Effects of Invention

According to an aspect of the present invention, it is possible to effectively cool a turbine vane and to suppress a usage amount of cooling air while improving durability.

DESCRIPTION OF EMBODIMENTS

Hereinafter, various embodiments of the present invention and modified examples thereof will be described in detail with reference to the drawings.

"Embodiment of Gas Turbine"

An embodiment of a gas turbine will be described with reference to FIGS. 1 and 2.

Figure 1:
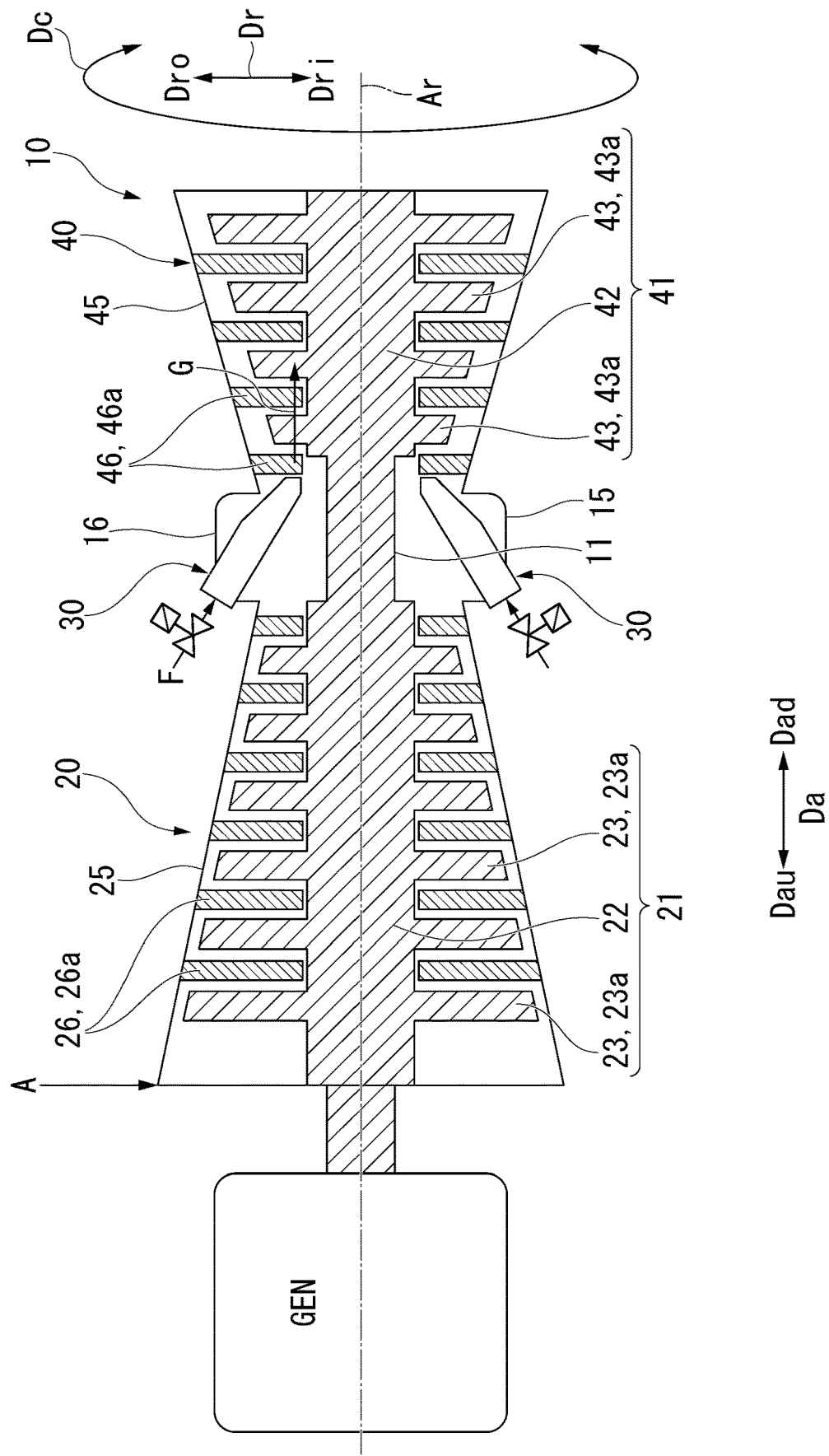
FIG. 1 is a schematic cross-sectional view of a gas turbine of an embodiment according to the present invention.

As shown in FIG. 1, a gas turbine 10 of this embodiment includes a compressor 20 which compresses air A, a combustor 30 which generates a combustion gas G by burning fuel F in the air A compressed by the compressor 20, and a turbine 40 which is driven by the combustion gas G.

The compressor 20 includes a compressor rotor 21 which rotates about an axis Ar, a compressor casing 25 which covers the compressor rotor 21, and a plurality of turbine vane rows 26. The turbine 40 includes a turbine rotor 41 which rotates about the axis Ar, a turbine casing 45 which covers the turbine rotor 41, and a plurality of turbine vane rows 46. Hereinafter, the extension direction of the axis Ar is referred to as the axis direction Da, the circumferential direction centered on the axis Ar is simply referred to as the circumferential direction Dc, and the direction perpendicular to the axis Ar is referred to as the radial direction Dr. Further, a first side of the axis direction Da is referred to as the axis upstream side Dau and the opposite side thereof is referred to as the axis downstream side Dad. Further, the side approaching the axis Ar in the radial direction Dr is referred to as the radial inside Dri and the opposite side thereof is referred to as the radial outside Dro.

The compressor 20 is disposed on the axis upstream side Dau with respect to the turbine 40.

The compressor rotor 21 and the turbine rotor 41 are located on the same axis Ar and are connected to each other to form a gas turbine rotor 11. For example, a rotor of a generator GEN is connected to the gas turbine rotor 11. The gas turbine 10 further includes an intermediate casing 16. This intermediate casing is disposed between the compressor casing 25 and the turbine casing 45 in the axis direction Da. The compressor casing 25, the intermediate casing 16, and the turbine casing 45 are connected to each other to form a gas turbine casing 15.

The compressor rotor 21 includes a rotor shaft 22 which extends in the axis direction Da about the axis Ar and a plurality of turbine blade rows 23 which are attached to the rotor shaft 22. The plurality of turbine blade rows 23 are arranged in the axis direction Da. Each turbine blade row 23 includes a plurality of turbine blades 23a arranged in the circumferential direction Dc. Any one turbine vane row 26 of the plurality of turbine vane rows 26 is disposed on each axis downstream side Dad in the plurality of turbine blade rows 23. Each turbine vane row 26 is disposed inside the compressor casing 25. Each turbine vane row 26 includes a plurality of turbine vanes 26a arranged in the circumferential direction Dc.

Figure 2:
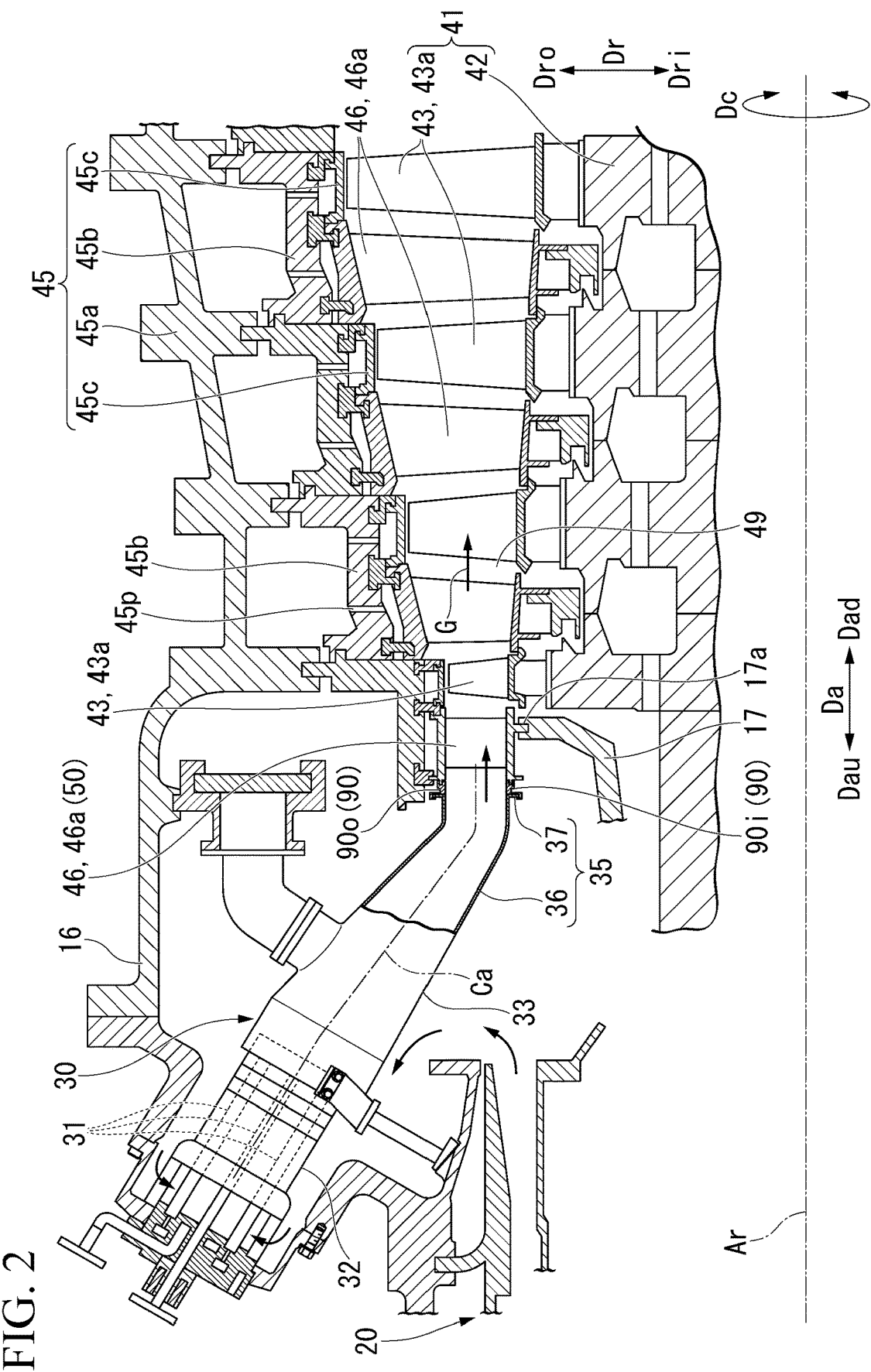
FIG. 2 is a main cross-sectional view of the gas turbine of the embodiment according to the present invention.

The turbine rotor 41 includes, as shown in FIGS. 1 and 2, a rotor shaft 42 which extends in the axis direction Da about the axis Ar and a plurality of turbine blade rows 43 which are attached to the rotor shaft 42. The plurality of turbine blade rows 43 are arranged in the axis direction Da. Each turbine blade row 43 includes a plurality of turbine blades 43a arranged in the circumferential direction Dc. Any one turbine vane row 46 of the plurality of turbine vane rows 46 is disposed on each axis upstream side Dau of the plurality of turbine blade rows 43. Each turbine vane row 46 is provided inside the turbine casing 45. Each turbine vane row 46 includes a plurality of turbine vanes 46a arranged in the circumferential direction Dc.

The turbine casing 45 includes a cylindrical outer casing 45a which constitutes the outer shell, an inner casing 45b which is fixed into the outer casing 45a, and a plurality of ring segments 45c which are fixed into the inner casing 45b. The plurality of ring segments 45c are all provided at positions between the plurality of turbine vane rows 46. Thus, the turbine blade row 43 is disposed on the radial inside Dri of each ring segment 45c.

An annular space which is located between the outer peripheral side of the rotor shaft 42 and the inner peripheral side of the turbine casing 45 and in which the turbine vane 46a and the turbine blade 43a are arranged in the axis direction Da constitutes a combustion gas flow path 49 in which the combustion gas G flows from the combustor 30. This combustion gas flow path 49 forms an annular shape about the axis Ar and is long in the axis direction Da. A cooling air passage 45p which penetrates from the radial outside Dro to the radial inside Dri is formed in the inner casing 45b of the turbine casing 45. The cooling air having passed through the cooling air passage 45p is introduced into the turbine vane 46a and the ring segment 45c and is used to cool the turbine vane 46a and the ring segment 45c. Depending on the turbine vane row 46, the air in the gas turbine casing 15 may be supplied to the turbine vane 46a constituting the turbine vane row 46 as the cooling air without passing through the cooling air passage 45p of the turbine casing 45.

The combustor 30 is attached to the intermediate casing 16. This combustor 30 includes, as shown in FIG. 2, a combustor basket (or combustor liner) 33 which burns fuel, a plurality of burners 31 which inject fuel into the combustor basket 33, a burner frame 32 which supports the plurality of burners 31, and a transition piece 35 which is connected to the downstream side of the combustor basket 33. The transition piece 35 includes a tubular cylinder 36 which is centered on the combustor axis Ca and a flange 37 which protrudes from one end of the cylinder 36 toward the outer peripheral side. The burner frame 32 is attached to the other end of the cylinder 36. The inner peripheral side of the cylinder 36 forms a combustion space. This cylinder 36 extends toward the axis downstream side Dad while the combustor 30 is attached to the intermediate casing 16. The flange 37 is provided at the downstream end of the cylinder 36 on the axis downstream side Dad.

The turbine vane 46a constituting the first-stage turbine vane row 46 on the most axis upstream side Dau in the plurality of turbine vane rows 46 and the flange 37 of the transition piece 35 are connected by an outlet seal 90.

As shown in FIG. 1, the compressor 20 generates compressed air by compressing the air A. This compressed air flows into the combustor 30. The fuel F is supplied to the combustor 30. In the combustor 30, the fuel F is burned in the compressed air to generate the high-temperature and high-pressure combustion gas G. This combustion gas G is sent from the combustor 30 to the combustion gas flow path 49 in the turbine 40. The combustion gas G rotates the turbine rotor 41 in the process of flowing in the combustion gas flow path 49 toward the axis downstream side Dad. By the rotation of this turbine rotor 41, the rotor of the generator GEN connected to the gas turbine rotor 11 rotates. As a result, the generator GEN generates electric power.

Hereinafter, various embodiments of the turbine vane constituting the first-stage turbine vane row 46 will be described.

"Embodiment of Turbine Vane"

Hereinafter, the embodiment of the turbine vane according to the present invention will be described with reference to FIGS. 3 to 8.

Figure 3:
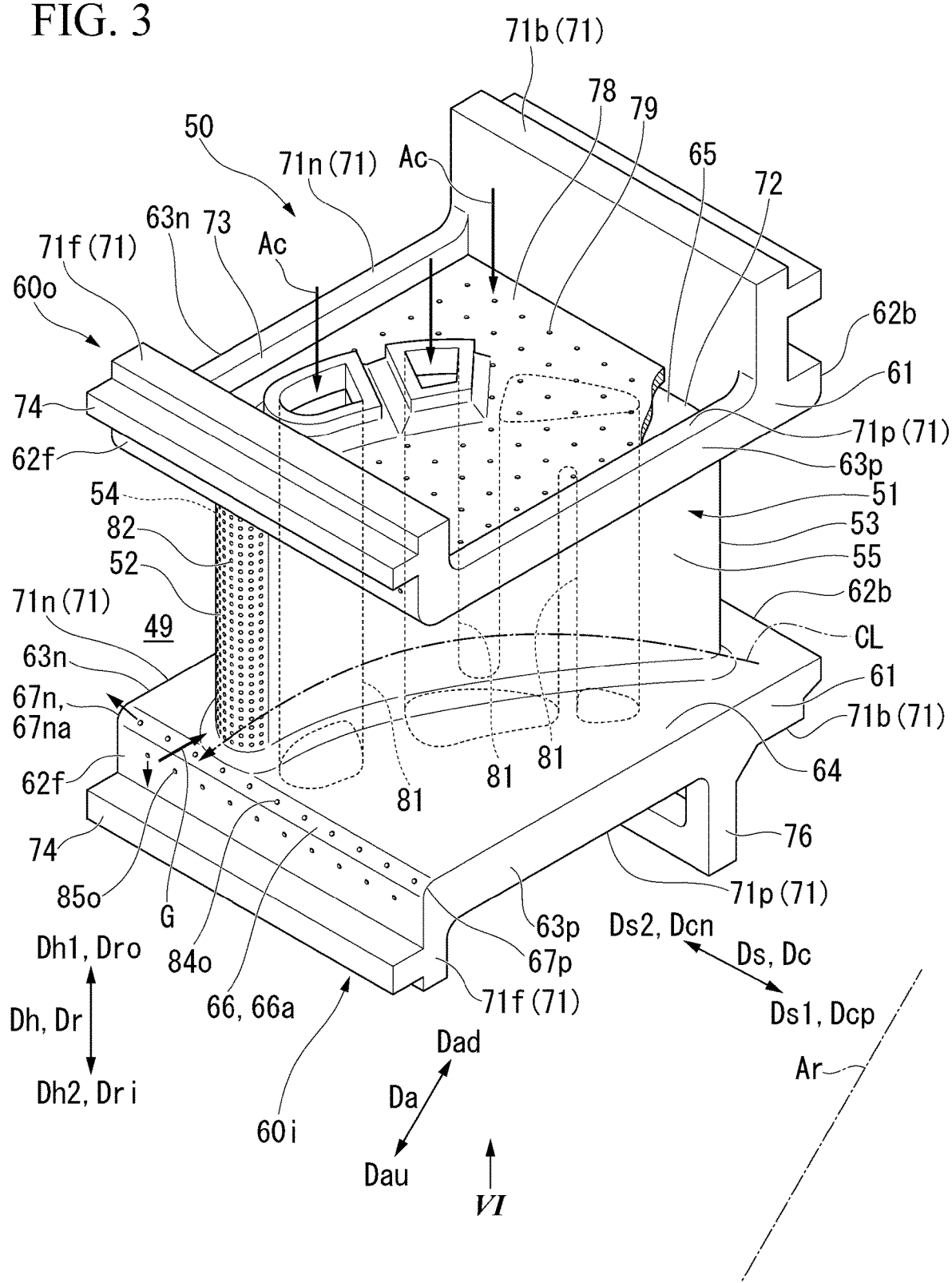
FIG. 3 is a perspective view of a turbine vane of the embodiment according to the present invention.

As shown in FIG. 3, the turbine vane 50 of this embodiment includes a blade body 51, an inner shroud 60i which is provided on a first side of the blade body 51 in the blade height direction Dh, and an outer shroud 60o which is provided on a second side of the blade body 51 in the blade height direction Dh.

In a state in which the turbine vane 50 is attached to the turbine casing 45 (see FIG. 2), the blade height direction Dh is the radial direction Dr. Further, the first height-direction side Dh1 which is a first side of the blade height direction Dh is the radial outside Dro and the second height-direction side Dh2 which is a second side of the blade height direction Dh is the radial inside Dri. Therefore, the inner shroud 60i is provided on the radial inside Dri of the blade body 51 and the outer shroud 60o is provided on the radial outside Dro of the blade body 51. Hereinafter, the blade height direction Dh is referred to as the radial direction Dr, the first height-direction side Dh1 is referred to as the radial outside Dro, and the second height-direction side Dh2 is referred to as the radial inside Dri.

Figure 5:
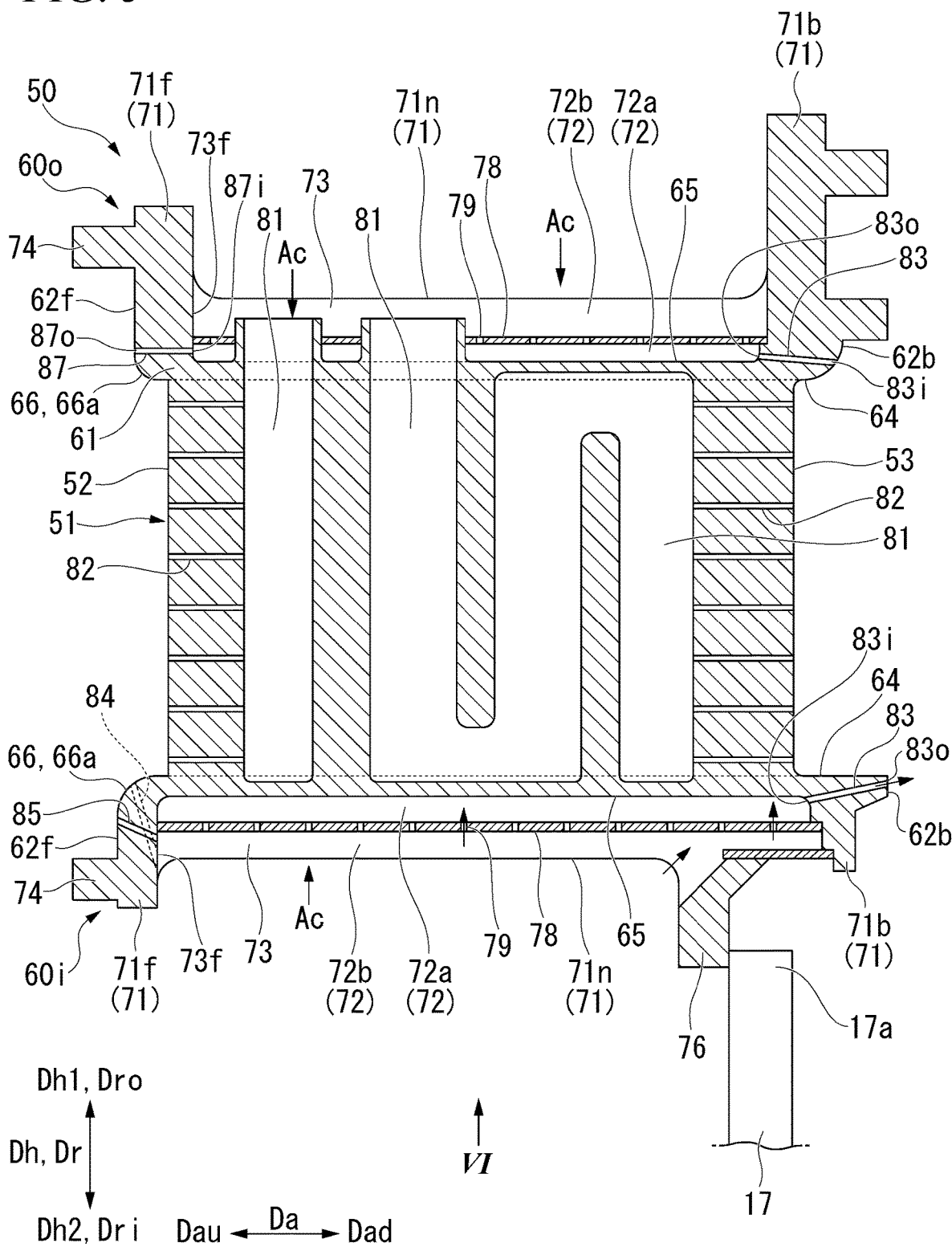
FIG. 5 is a cross-sectional view of the turbine vane of the embodiment according to the present invention.
Figure 6:
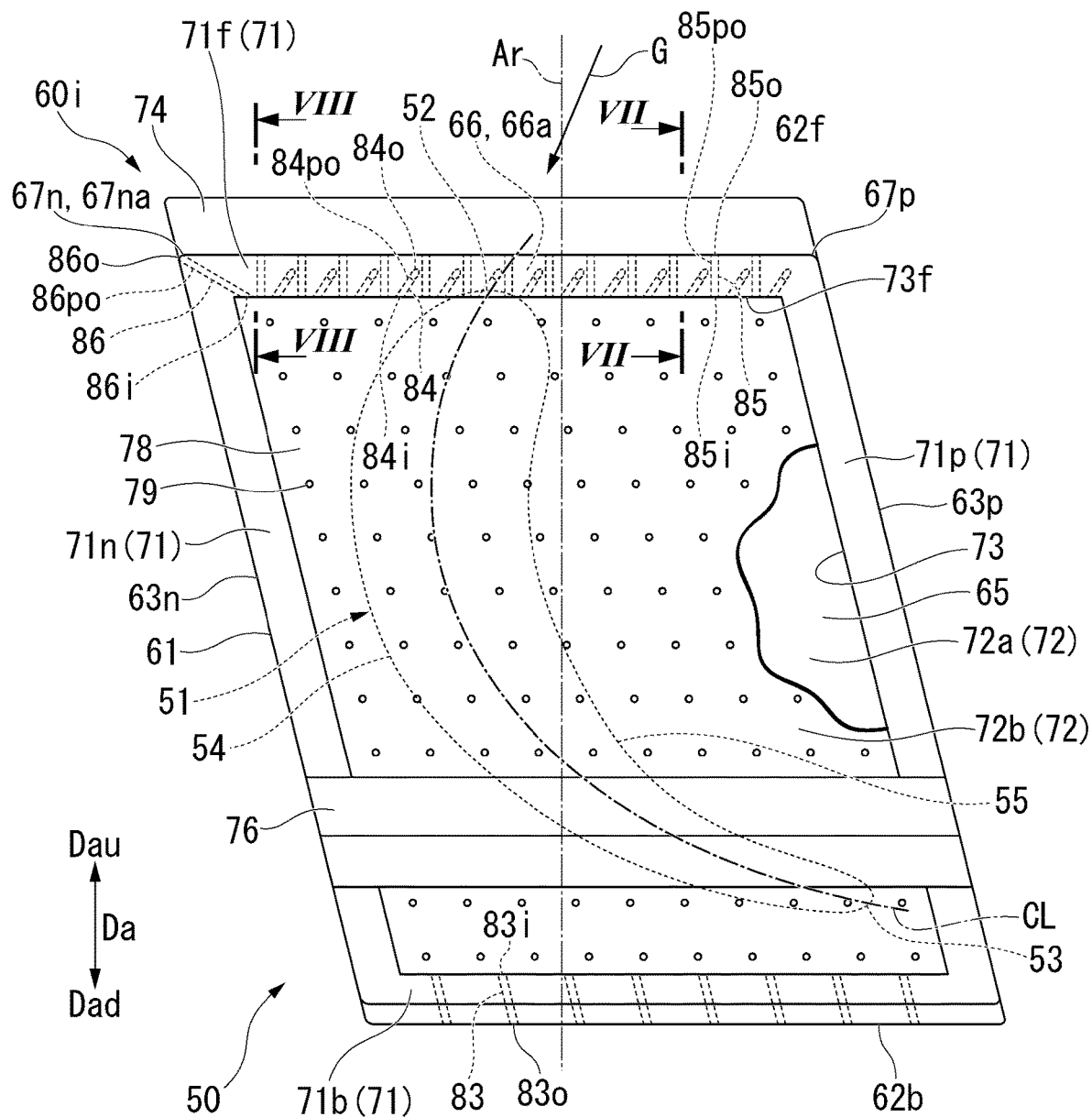
FIG. 6 is a view taken along the line VI in FIG. 3.

The blade body 51 includes, as shown in FIGS. 3, 5, and 6, a leading edge 52, a trailing edge 53, a suction side (suction side of the blade) 54 which is a convex surface, and a pressure side (pressure side of the blade) 55 which is a concave surface. The leading edge 52 and the trailing edge 53 exist in the connection portion between the suction side 54 and the pressure side 55. All of the leading edge 52, the trailing edge 53, the suction side 54, and the pressure side 55 extend in the radial direction Dr which is the blade height direction Dh. The leading edge 52 is located on the axis upstream side Dau with respect to the trailing edge 53 while the turbine vane 50 is attached to the turbine casing 45.

The blade body 51 is disposed in the combustion gas flow path 49 through which the combustion gas G passes. The inner shroud 60i defines the edge of the annular combustion gas flow path 49 on the radial inside Dri. Further, the outer shroud 60o defines the edge of the annular combustion gas flow path 49 on the radial outside Dro.

Figure 4:
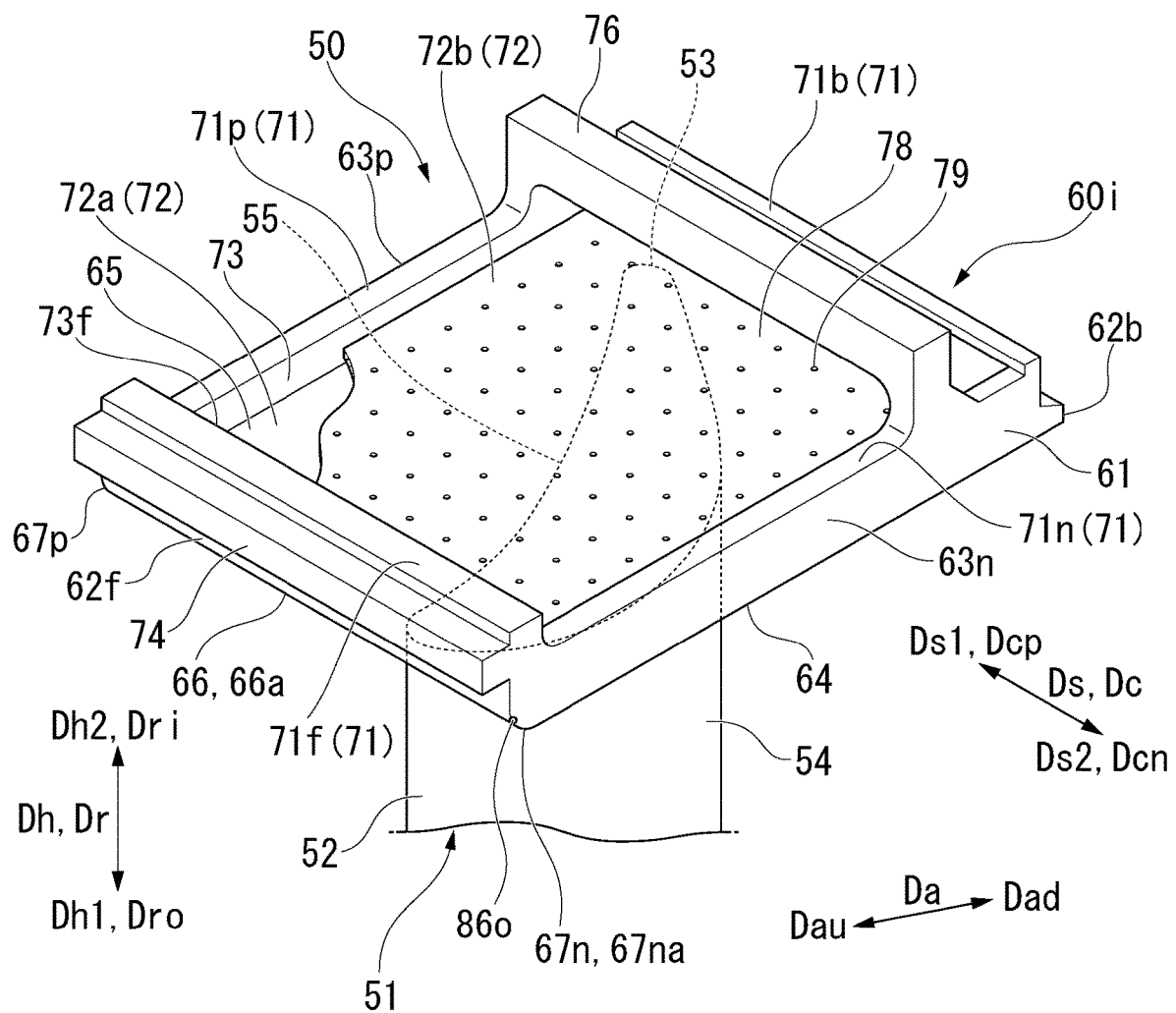
FIG. 4 is a perspective view of an inner shroud of the embodiment according to the present invention.

The inner shroud 60i includes, as shown in FIGS. 4 to 6, a shroud main body 61, a peripheral wall 71, an upstream protrusion 74, and a retainer 76.

The shroud main body 61 is a plate-shaped member that spreads in a direction including a directional component perpendicular to the radial direction Dr which is the blade height direction Dh. This shroud main body 61 includes a gas path surface 64, an anti-gas path surface 65, a front end surface 62f, a rear end surface 62b, a suction side end surface 63n, and a pressure side end surface 63p.

The gas path surface 64 is a surface which is directed toward the radial outside Dro corresponding to the first height-direction side Dh1 and with which the combustion gas G is in contact. The anti-gas path surface 65 is a surface which is directed toward the radial inside Dri corresponding to the second height-direction side Dh2. This anti-gas path surface 65 has a back-to-back relationship with the gas path surface 64. The front end surface 62f is a surface which is located on the axis upstream side Dau in relation to the blade body 51 and is directed toward the axis upstream side Dau. The rear end surface 62b is a surface which is located on the axis downstream side Dad in relation to the blade body 51 and is directed toward the axis downstream side Dad. The suction side end surface 63n is a side end surface on the suction side where the suction side 54 of the blade body 51 exists with reference to the camber line CL of the blade body 51 and is a surface located on the suction side in relation to the blade body 51. This suction side end surface 63n connects the front end surface 62f and the rear end surface 62b. The pressure side end surface 63p is a side end surface on the pressure side where the pressure side 55 of the blade body 51 exists with reference to the camber line CL of the blade body 51 and is a surface located on the pressure side in relation to the blade body 51. This pressure side end surface 63p connects the front end surface 62f and the rear end surface 62b. This pressure side end surface 63p is located on the side opposite to the suction side end surface 63n with respect to the blade body 51. The rear end surface 62b is almost parallel to the front end surface 62f. Further, the pressure side end surface 63p is almost parallel to the suction side end surface 63n. Thus, the shroud main body 61 has a parallel quadrilateral shape as shown in FIG. 6 when viewed from the radial direction Dr.

Here, a direction in which the pressure side end surface 63p and the suction side end surface 63n are arranged and which is orthogonal to the axis Ar is referred to as the lateral direction Ds. In a state in which the turbine vane 50 is attached to the turbine casing 45 (see FIG. 2), the lateral direction Ds is the circumferential direction Dc. Further, the first lateral side Ds1 which is a first side of the lateral direction Ds is the circumferential pressure side Dcp and the second lateral side Ds2 which is a second side of the lateral direction Ds is the circumferential suction side Dcn. Hereinafter, the lateral direction Ds is referred to as the circumferential direction Dc. Further, the first lateral side Ds1 is referred to as the circumferential pressure side Dcp and the second lateral side Ds2 is referred to as the circumferential suction side Dcn.

The shroud main body 61 further includes a front end corner portion 66, a front end pressure side corner portion 67p, and a front end suction side corner portion 67n. The front end corner portion 66 is a corner portion between the gas path surface 64 and the front end surface 62f. The front end corner portion 66 includes a front end slope 66a which is inclined with respect to each of the front end surface 62f and the pressure side end surface 63p. The front end pressure side corner portion 67p is a corner portion between the gas path surface 64, the front end surface 62f, and the pressure side end surface 63p. The front end suction side corner portion 67n is a corner portion between the gas path surface 64, the front end surface 62f, and the suction side end surface 63n. The front end suction side corner portion 67n includes a front end suction side slope 67na which is inclined with respect to each of the gas path surface 64, the front end surface 62f, and the suction side end surface 63n. Additionally, in FIGS. 6 and 7, the front end slope 66a is inclined with respect to each of the front end surface 62f and the pressure side end surface 63p and draws a curved surface connecting the front end surface 62f and the pressure side end surface 63p. However, if the front end slope 66a is inclined with respect to each of the front end surface 62f and the pressure side end surface 63p, the front end slope may be a flat surface connecting the front end surface 62f and the pressure side end surface 63p.

The peripheral wall 71 is a wall which protrudes from the shroud main body 61 toward the radial inside Dri along the outer edge of the shroud main body 61. The peripheral wall 71 includes a front peripheral wall 71f and a rear peripheral wall 71b which face each other in the axis direction Da and a pressure side peripheral wall 71p and a suction side peripheral wall 71n which face each other in the circumferential direction Dc. The front peripheral wall 71f is located on the axis upstream side Dau in relation to the blade body 51. The front peripheral wall 71f protrudes toward the radial outside Dro and the radial inside Dri in relation to the pressure side peripheral wall 71p and the suction side peripheral wall 71n with respect to the shroud main body 61. The surface of the front peripheral wall 71f facing the axis upstream side Dau constitutes a part of the front end surface 62f of the inner shroud 60i. The rear peripheral wall 71b is located on the axis downstream side Dad in relation to the blade body 51. The pressure side peripheral wall 71p is located on the circumferential pressure side Dcp in relation to the blade body 51. The surface of this pressure side peripheral wall 71p facing the circumferential pressure side Dcp constitutes a part of the pressure side end surface 63p of the inner shroud 60i. The suction side peripheral wall 71n is located on the circumferential suction side Dcn in relation to the blade body 51. The surface of this suction side peripheral wall 71n facing the circumferential suction side Dcn constitutes a part of the suction side end surface 63n of the inner shroud 60i.

The inner shroud 60i is provided with a cavity 72 which is recessed toward the radial inside Dri by the shroud main body 61 and the peripheral wall 71. This cavity 72 is defined by the anti-gas path surface 65 of the shroud main body 61, the surface of the front peripheral wall 71f facing the axis downstream side Dad, the surface of the rear peripheral wall 71b facing the axis upstream side Dau, the surface of the pressure side peripheral wall 71p facing the circumferential suction side Dcn, and the surface of the suction side peripheral wall 71n facing the circumferential pressure side Dcp. Thus, a cavity defining surface 73 defining the cavity 72 is formed by these surfaces. Additionally, for convenience of the following description, the surface of the front peripheral wall 71f facing the axis downstream side Dad is referred to as a front cavity defining surface 73f.

The retainer 76 is located between the front peripheral wall 71f and the rear peripheral wall 71b in the axis direction Da and is formed from the suction side end surface 63n to the pressure side end surface 63p. This retainer 76 is connected to an end 17a on the radial outside Dro in an inner cover 17 fixed to the gas turbine casing 15 (see FIGS. 2 and 3) and the portion of this turbine vane 50 on the radial inside Dri is supported by the inner cover 17.

The upstream protrusion 74 protrudes toward the axis upstream side Dau from a position separated from the gas path surface 64 in the front end surface 62f.

The turbine vane 50 further includes, as shown in FIGS. 4 and 5, a collision plate 78. This collision plate 78 divides the cavity 72 into a first side cavity 72a which is a region on the radial outside Dro and a second side cavity 72b which is a region on the radial inside Dri. This collision plate 78 is provided with a plurality of through-holes 79 penetrating in the radial direction Dr. A part of the cooling air Ac existing on the radial inside Dri of the turbine vane 50 flows into the second side cavity 72b. A part of the cooling air flowing into the second side cavity 72b passes through the through-hole 79 of the collision plate 78, flows into the first side cavity 72a, and performs impingement cooling of the anti-gas path surface 65.

The outer shroud 60o basically has the same configuration as that of the inner shroud 60i. Thus, the outer shroud 60o also includes the shroud main body 61, the peripheral wall 71, and the upstream protrusion 74 similarly to the inner shroud 60i. However, the outer shroud 60o does not include a portion corresponding to the retainer 76 of the inner shroud 60i. Similarly to the shroud main body 61 of the inner shroud 60i, the shroud main body 61 of this outer shroud 60o also includes the gas path surface 64, the anti-gas path surface 65, the front end surface 62f, the rear end surface 62b, the suction side end surface 63n, the pressure side end surface 63p, the front end corner portion 66, the front end pressure side corner portion 67p, and the front end suction side corner portion 67n. Further, similarly to the peripheral wall 71 of the inner shroud 60i, the peripheral wall 71 of this outer shroud 60o also includes the front peripheral wall 71f, the rear peripheral wall 71b, the pressure side peripheral wall 71p, and the suction side peripheral wall 71n. The front peripheral wall 71f and the rear peripheral wall 71b of the outer shroud 60o serve to attach the turbine vane 50 to the inner peripheral side of the turbine casing 45 (see FIG. 2).

The above-described outlet seal 90 includes, as shown in FIG. 2, an outer outlet seal 90o which connects the outer shroud 60o and the portion on the radial outside Dro in the flange 37 of the transition piece 35 and an inner outlet seal 90i which connects the inner shroud 60i and the portion on the radial inside Dri in the flange 37 of the transition piece 35.

Figure 7:
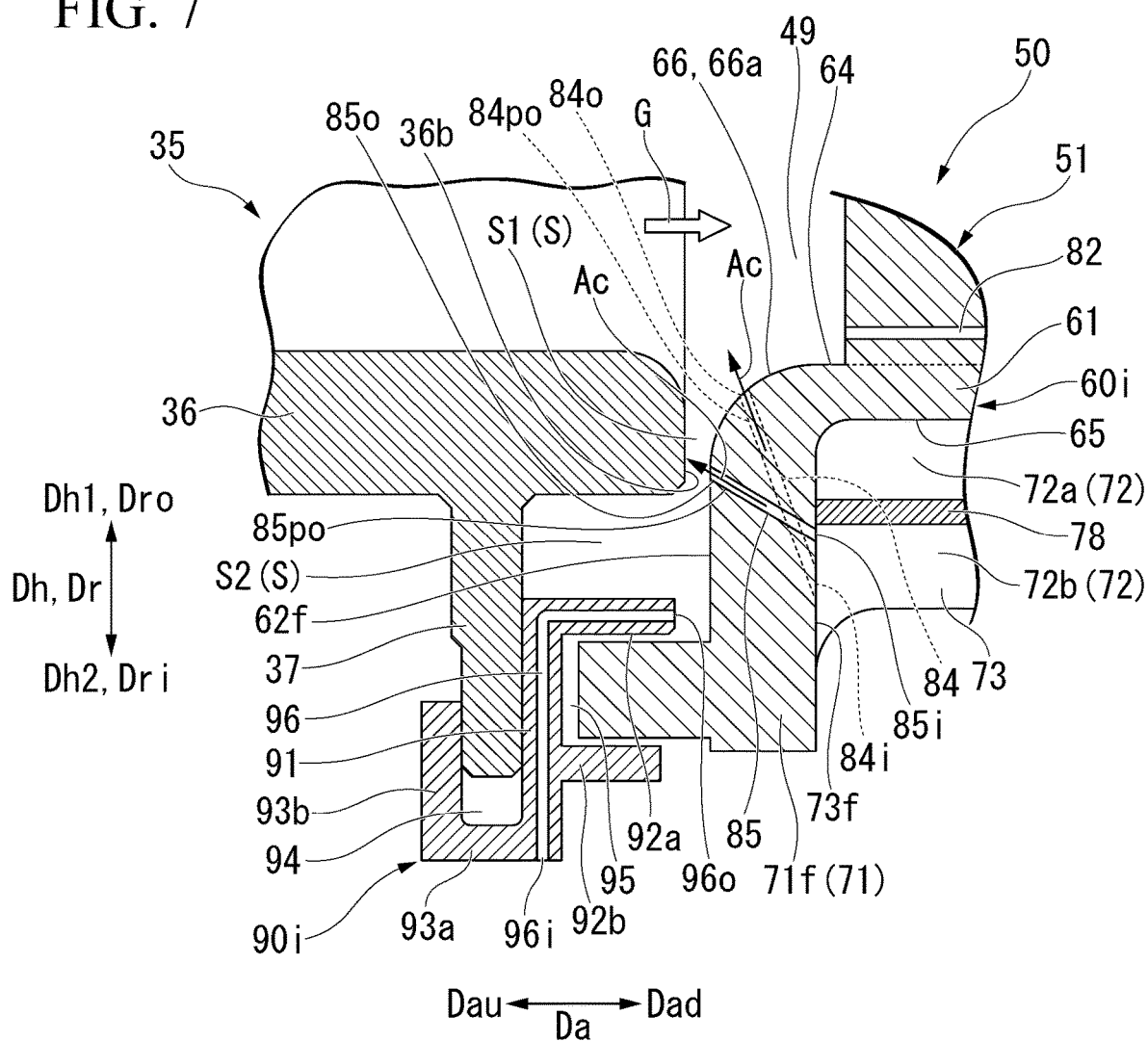
FIG. 7 is a cross-sectional view taken along the line VII-VII in FIG. 6.

The inner outlet seal 90i includes, as shown in FIG. 7, a main plate 91, a first downstream plate 92a, a second downstream plate 92b, a first upstream plate 93a, and a second upstream plate 93b. The main plate 91 extends in the circumferential direction Dc and the radial direction Dr. The first downstream plate 92a and the second downstream plate 92b extend in the circumferential direction Dc and the axis direction Da. The first downstream plate 92a extends from the end of the main plate 91 on the radial outside Dro toward the axis downstream side Dad. The second downstream plate 92b extends toward the axis downstream side Dad from the substantially middle position between the end on the radial outside Dro and the end on the radial inside Dri in the main plate 91. This second downstream plate 92b faces the first downstream plate 92a in the radial direction Dr with a gap therebetween in the radial direction Dr.

The first upstream plate 93a extends in the circumferential direction Dc and the axis direction Da. This first upstream plate 93a extends from the end of the main plate 91 on the radial inside Dri toward the axis upstream side Dau. The second upstream plate 93b extends in the circumferential direction Dc and the radial direction Dr. This second upstream plate 93b extends from the end of the first upstream plate 93a on the axis upstream side Dau toward the radial outside Dro. This second upstream plate 93b faces the main plate 91 in the axis direction Da with a gap therebetween in the axis direction Da.

In the members constituting the inner outlet seal 90i, the member closest to the combustion gas flow path 49 in the radial direction Dr is the first downstream plate 92a. This first downstream plate 92a is located on the radial inside Dri in relation to the cylinder 36 of the transition piece 35 and the shroud main body 61 of the inner shroud 60i. Thus, this first downstream plate 92a is separated from the combustion gas flow path 49 in the radial direction Dr.

The inner outlet seal 90i includes a transition piece connection portion 94, a turbine vane connection portion 95, and a cooling air passage 96. The transition piece connection portion 94 is a groove which is recessed toward the radial inside Dri so as to enter the flange 37 of the transition piece 35. The transition piece connection portion 94 which is the groove is formed by the main plate 91, the first upstream plate 93a, and the second upstream plate 93b. The turbine vane connection portion 95 is a groove which is depressed toward the axis upstream side Dau so as to enter the upstream protrusion 74 of the inner shroud 60i. The turbine vane connection portion 95 which is the groove is formed by the main plate 91, the first downstream plate 92a, and the second downstream plate 92b. The cooling air passage 96 includes an inlet 96i which is opened at the end of the main plate 91 on the radial inside Dri and an outlet 96o which is opened at the end of the first downstream plate 92a on the axis downstream side Dad.

The rear end surface 36b of the cylinder 36 faces a portion near the gas path surface 64 in the front end surface 62f and the front end corner portion 66 of the inner shroud 60i with a gap therebetween in the axis direction Da. The flange 37 of the transition piece 35 faces a portion separated from the gas path surface 64 in the front end surface 62f of the inner shroud 60i with a gap therebetween in the axis direction Da. The gap in the axis direction Da between the rear end surface 36b of the cylinder 36 and the front end surface 62f and the front end corner portion 66 of the inner shroud 60i forms a first gap S1. The space surrounded by the flange 37 of the transition piece 35, the front end surface 62f of the inner shroud 60i, and the first downstream plate 92a of the inner outlet seal 90i form a second gap S2. Thus, this second gap S2 exists at a position separated from the combustion gas flow path 49 in the radial direction Dr.

The first gap S1 and the second gap S2 are connected to each other in the radial direction Dr to form one gap space S. The outlet seal 90 serves to prevent a part of the combustion gas G flowing in the transition piece 35 from flowing out into the intermediate casing 16 through this gap space S.

The outer outlet seal 90o has the same configuration as that of the inner outlet seal 90i. However, the interrelationship of the components of the outer outlet seal 90o in the radial direction Dr is opposite to the interrelationship of the components of the inner outlet seal 90i in the radial direction Dr. Therefore, for example, the first downstream plate 92a of the outer outlet seal 90o is provided at the end of the main plate 91 of the outer outlet seal 90o on the radial inside Dri. Further, the transition piece connection portion 94 of the outer outlet seal 90o is a groove which is recessed toward the radial outside Dro.

The blade body 51, the outer shroud 60o, and the inner shroud 60i are provided with, as shown in FIGS. 3 and 5, a plurality of blade air passages 81 extending in the radial direction Dr. All blade air passages 81 are formed from the outer shroud 60o to the blade body 51 to be connected to the inner shroud 60i. The plurality of blade air passages 81 are arranged along the camber line CL of the blade body 51. A part of the adjacent blade air passages 81 communicate with each other at the portion on the radial outside Dro or the portion on the radial inside Dri. Further, any one of the pluralities of blade air passages 81 is opened at the anti-gas path surface 65 of the outer shroud 60o. Further, any one of the pluralities of blade air passages 81 is opened at the anti-gas path surface 65 of the inner shroud 60i. A part of the cooling air Ac existing on the radial outside Dro or the radial inside Dri of the turbine vane 50 flows from the opening of the blade air passage 81 into the blade air passage 81. The leading edge 52 and the trailing edge 53 of the blade body 51 are provided with a plurality of blade profile ejection paths 82 penetrating from the blade air passage 81 toward the combustion gas flow path 49.

The inner shroud 60i is provided with, as shown in FIGS. 5 and 6, a plurality of rear end passages 83, a plurality of first air passages 84, a plurality of second air passages 85, and a third air passage 86.

The plurality of rear end passages 83 are arranged in the circumferential direction Dc. These rear end passages 83 include inlets 83i and outlets 83o. The inlet 83i is formed in a surface that defines the first side cavity 72a and faces the axis upstream side Dau of the rear peripheral wall 71b. The outlet 83o is formed in the rear end surface 62b.

The plurality of first air passages 84 are, as shown in FIGS. 5 to 7, arranged in the circumferential direction Dc. These first air passages 84 include, as shown in FIG. 7, first inlets 84i and first outlets 84o. The first inlet 84i is opened at a portion that defines the second side cavity 72b in the front cavity defining surface 73f. The first outlet 84o is opened by the front end slope 66a in the front end corner portion 66. The first air passage 84 includes a first outlet side portion 84po including the first outlet 84o in the first air passage 84. This first outlet side portion 84po is formed to be gradually directed toward the radial outside Dro as it goes toward the axis upstream side Dau. Further, this first outlet side portion 84po is inclined to be gradually directed toward the circumferential pressure side Dcp as it goes toward the axis upstream side Dau (see FIG. 6).

The plurality of second air passages 85 are, as shown in FIGS. 5 to 7, arranged in the circumferential direction Dc. In this embodiment, the plurality of first air passages 84 and the plurality of second air passages 85 are alternately arranged in the circumferential direction Dc. These second air passages 85 include, as shown in FIG. 7, second inlets 85i and second outlets 85o. The second inlet 85i is opened at a portion that defines the second side cavity 72b in the front cavity defining surface 73f. The second outlet 85o is opened at the front end surface 62f. This second outlet 85o faces the rear end surface 36b of the cylinder 36 in the axis direction Da.

The second air passage 85 includes a second outlet side portion 85po including the second outlet 85o in the second air passage 85. This second outlet side portion 85po is formed to be gradually directed toward the radial outside Dro as it goes toward the axis upstream side Dau.

Figure 8:
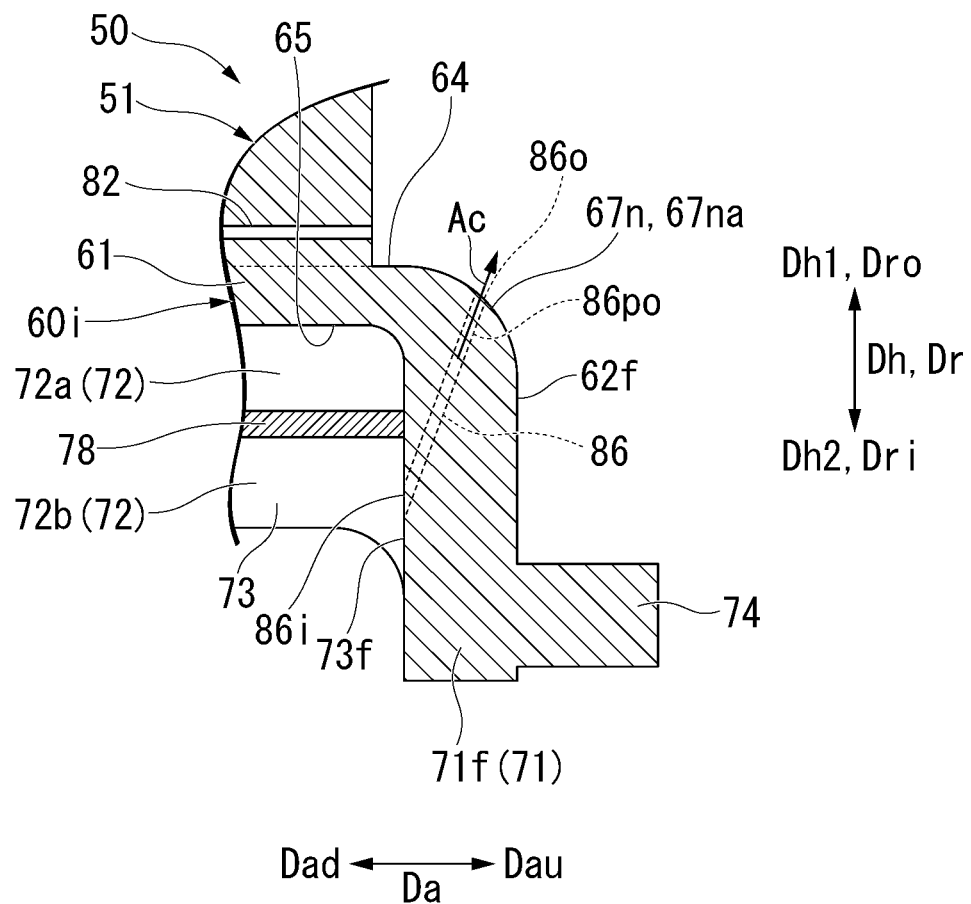
FIG. 8 is a cross-sectional view taken along the line VIII-VIII in FIG. 6.

The third air passage 86 includes, as shown in FIGS. 6 and 8, a third inlet 86i and a third outlet 86o. The third inlet 86i is opened at a portion that defines the second side cavity 72b in the front cavity defining surface 73f. The third outlet 86o is opened by the front end suction side slope 67na in the front end suction side corner portion 67n. The third air passage 86 includes a third outlet side portion 86po including the third outlet 86o in the third air passage 86. This third outlet side portion 86po is formed to be gradually directed toward the radial outside Dro as it goes toward the axis upstream side Dau. Further, this third outlet side portion 86po is inclined to be gradually directed toward the circumferential suction side Dcn as it goes toward the axis upstream side Dau.

The outer shroud 60o is provided with, as shown in FIG. 5, the plurality of rear end passages 83 and a plurality of fourth air passages 87.

The plurality of rear end passages 83 are arranged in the circumferential direction Dc similarly to the plurality of rear end passages 83 of the inner shroud 60i. These rear end passages 83 include inlets 83i and outlets 83o. The inlet 83i is formed in a surface that defines the first side cavity 72a of the outer shroud 60o and faces the axis upstream side Dau of the rear peripheral wall 71b. The outlet 83o is formed in the rear end surface 62b of the outer shroud 60o.

The plurality of fourth air passages 87 are arranged in the circumferential direction Dc. These fourth air passages 87 include fourth inlets 87i and fourth outlets 87o. The fourth inlet 87i is opened at a portion that defines the first side cavity 72a in the front cavity defining surface 73f of the outer shroud 60o. The fourth outlet 87o is opened at the front end surface 62f of the outer shroud 60o.

Additionally, the first air passage 84 and the second air passage 85 may be formed in the outer shroud 60o instead of the fourth air passage 87. Further, the third air passage 86 may be formed in the outer shroud 60o. In this way, when the first air passage 84, the second air passage 85, or the like is formed in the outer shroud 60o, the first height-direction side Dh1 of this outer shroud 60o is the radial inside Dri and the second height-direction side Dh2 of this outer shroud 60o is the radial outside Dro. Therefore, for example, the first outlet side portion 84po in the first air passage 84 formed in the outer shroud 60o is formed to be gradually directed toward the radial inside Dri as it goes toward the axis upstream side Dau.

The turbine vane 50 is exposed to the high-temperature combustion gas G while the gas turbine 10 is driven. Therefore, various passages are formed in the turbine vane 50 and air is passed through the passages to cool the turbine vane 50.

Incidentally, in the combustion gas flow path 49, a pressure distribution is generated in the circumferential direction Dc in the periphery of the upstream side of the turbine vane 50 due to the relationship of the combustion gas flow flowing between two turbine vanes 50 adjacent to each other in the circumferential direction Dc.

That is, in the periphery of the upstream side of the turbine vane 50, the pressure of the portion on the first lateral side Ds1 (the pressure side) with reference to the leading edge 52 of the blade body 51 increases and the pressure of the second lateral side Ds2 (the suction side) relatively decreases. Therefore, the combustion gas G flowing in the combustion gas flow path 49 easily flows into the gap space S from the portion on the first lateral side Ds1 (the pressure side) in relation to the portion on the second lateral side Ds2 (the suction side) with reference to the leading edge 52 of the blade body 51 in the rear end surface 36b of the transition piece 35 and the front end surface 62f of the inner shroud 60i. Further, a part of the inflowing combustion gas G moves through the gap space S in the circumferential direction Dc and is discharged to the combustion gas flow path 49 on the second lateral side Ds2 having a low pressure.

Focusing on the inner shroud 60i of the turbine vane 50, the gas path surface 64 of the inner shroud 60i is exposed to the combustion gas G as shown in FIG. 7. Further, when no air flows in the first air passage 84 and the second air passage 85, the combustion gas G flows into the gap space S between the transition piece 35 and the inner shroud 60i as described above. Therefore, the front end corner portion 66 which is the corner portion between the gas path surface 64 and the front end surface 62f is heated on two sides by the heat input from the side of the gas path surface 64 and the side of the front end surface 62f. Thus, the front end corner portion 66 is more easily heated by the combustion gas G than the gas path surface 64 or the front end surface 62f.

The compressed air in the intermediate casing 16 flows into the second side cavity 72b of the inner shroud 60i. A part of the compressed air flows from the first inlet 84i into the first air passage 84 as the cooling air Ac. The other part of this compressed air flows from the second inlet 85i into the second air passage 85 as the cooling air Ac. Further, the other part of this compressed air flows from the third inlet 86i into the third air passage 86 (see FIG. 8) as the cooling air Ac.

The cooling air Ac flowing into the first air passage 84 convection-cools the portion of the inner shroud 60i on the axis upstream side Dau and particularly the portion of the gas path surface 64 on the axis upstream side Dau in the process of passing through the first air passage 84. The cooling air Ac flows out from the first outlet 84o formed in the front end corner portion 66 into the combustion gas flow path 49. The cooling air Ac flowing out into the combustion gas flow path 49 functions as purge air to suppress the combustion gas G from reaching the front end corner portion 66 and suppress the front end corner portion 66 from being heated by the combustion gas G. Further, the cooling air Ac flowing out into the combustion gas flow path 49 functions as purge air that suppresses the combustion gas G from flowing into the gap space S between the transition piece 35 and the inner shroud 60i and decreases the temperature of the gas flowing into this gap space S by the dilution of the combustion gas G.

As described above, the first outlet side portion 84po of the first air passage 84 is gradually directed toward the radial outside Dro as it goes toward the axis upstream side Dau. Therefore, the cooling air Ac flowing out of this first air passage 84 is gradually directed toward the radial outside Dro as it goes toward the axis upstream side Dau. Thus, it is possible to effectively suppress the combustion gas G from reaching the front end corner portion 66 and to suppress the combustion gas G from flowing into the gap space S by the cooling air Ac flowing out of this first air passage 84. Further, this first outlet side portion 84po is gradually directed toward the circumferential pressure side Dcp as it goes toward the axis upstream side Dau. Therefore, even when the distance between the front cavity defining surface 73f provided with the first inlet 84i and the front end corner portion 66 provided with the first outlet 84o is short, the passage length of the first air passage 84 can be lengthened by forming the first air passage 84 as an inclined passage extending in the radial direction Dr. Thus, it is possible to effectively convection-cool the portion of the inner shroud 60i on the axis upstream side Dau by the cooling air Ac passing through this first air passage 84.

Here, the cooling air Ac passing through the first air passage 84 has an effect of convection-cooling the inner shroud 60i exposed to the combustion gas G. Further, the cooling air Ac flowing out of the first air passage 84 has an effect as purge air that suppresses the contact of the combustion gas G with the inner shroud 60i and the heating of this inner shroud 60i. The first air passage 84 is a passage in which the convection-cooling effect of the cooling air Ac passing through the first air passage 84 is larger than the effect of allowing the cooling air Ac flowing out of the first air passage 84 to function as purge air.

The cooling air Ac flowing into the second air passage 85 convection-cools the portion of the inner shroud 60i on the axis upstream side Dau and particularly the periphery of the front end surface 62f in the process of passing through this second air passage 85. The cooling air Ac flows out of the second outlet 85o formed in the front end surface 62f into the gap space S. The cooling air Ac flowing out into the gap space S suppresses the heating of the rear end surface 36b of the transition piece 35 and the front end surface 62f by the combustion gas G by suppressing the combustion gas G from reaching the front end surface 62f facing the gap space S. That is, this cooling air Ac convection-cools the periphery of the front end surface 62f and dilutes the combustion gas G flowing into the gap space S to decrease the gas temperature in this gap space S and to suppress the heating of the front end surface 62f, the rear end surface 36b of the transition piece 35, and the periphery of them. Further, the cooling air Ac flowing out into the gap space S functions as purge air that suppresses the combustion gas G from flowing into this gap space S.

As described above, the second outlet side portion 85po of the second air passage 85 is gradually directed toward the radial outside Dro as it goes toward the axis upstream side Dau. Therefore, the cooling air Ac flowing out of this second air passage 85 is gradually directed toward the radial outside Dro as it goes toward the axis upstream side Dau. Thus, it is possible to effectively suppress the combustion gas G from flowing into the gap space S by the cooling air Ac flowing out of this second air passage 85.

This second air passage 85 is a passage in which the effect of allowing the cooling air Ac to function as purge air is larger than the convection-cooling effect compared to the first air passage 84.

The cooling air Ac flowing into the third air passage 86 convection-cools the portion of the inner shroud 60i on the axis upstream side Dau and particularly the portion of the gas path surface 64 on the axis upstream side Dau and the circumferential suction side Dcn and the portion of the suction side end surface 63n on the axis upstream side Dau in the process of passing through this third air passage 86. The cooling air Ac flows from the third outlet 86o formed in the front end suction side corner portion 67n into the combustion gas flow path 49. The cooling air Ac flowing out into the combustion gas flow path 49 suppresses the heating of the front end suction side corner portion 67n by the combustion gas G by suppressing the combustion gas G from reaching the front end suction side corner portion 67n. That is, this cooling air Ac film-cools the front end suction side corner portion 67n and the periphery thereof. Further, the cooling air Ac flowing out into the combustion gas flow path 49 suppresses the combustion gas G from flowing into the gap space S between the transition piece 35 and the inner shroud 60i and decreases the temperature of the gas flowing into this gap space S.

Incidentally, the portion of the inner shroud 60i on the axis upstream side Dau in only one air passage of the first air passage 84 and the second air passage 85 is cooled and the thermal damage of this portion can be suppressed. Here, a case in which the portion of the inner shroud 60i on the axis upstream side Dau is cooled only by the first air passage 84 will be considered. In this case, the effect of the second air passage 85 also needs to be borne by the first air passage 84. Therefore, for example, the passage cross-sectional area of the first air passage 84 needs to be increases so that the flow rate of the cooling air Ac flowing through the first air passage 84 becomes higher than the total flow rate of the cooling air Ac flowing through the first air passage 84 and the second air passage 85 in this embodiment.

Further, a case in which the portion of the inner shroud 60i on the axis upstream side Dau is cooled only by the second air passage 85 will be considered. In this case, the effect of the first air passage 84 also needs to be borne by the first air passage 84. Therefore, for example, the number of the second air passages 85 needs to be increased so that the flow rate of the cooling air Ac flowing through the second air passage 85 becomes higher than the total flow rate of the cooling air Ac flowing through the first air passage 84 and the second air passage 85 in this embodiment.

Thus, since the inner shroud 60i of this embodiment includes the first air passage 84 and the second air passage 85, it is possible to effectively cool the inner shroud 60i and to suppress the usage amount of the cooling air Ac for cooling the inner shroud 60i while improving the durability of the inner shroud 60i.

"Modified Example of Turbine Vane"

Figure 9:
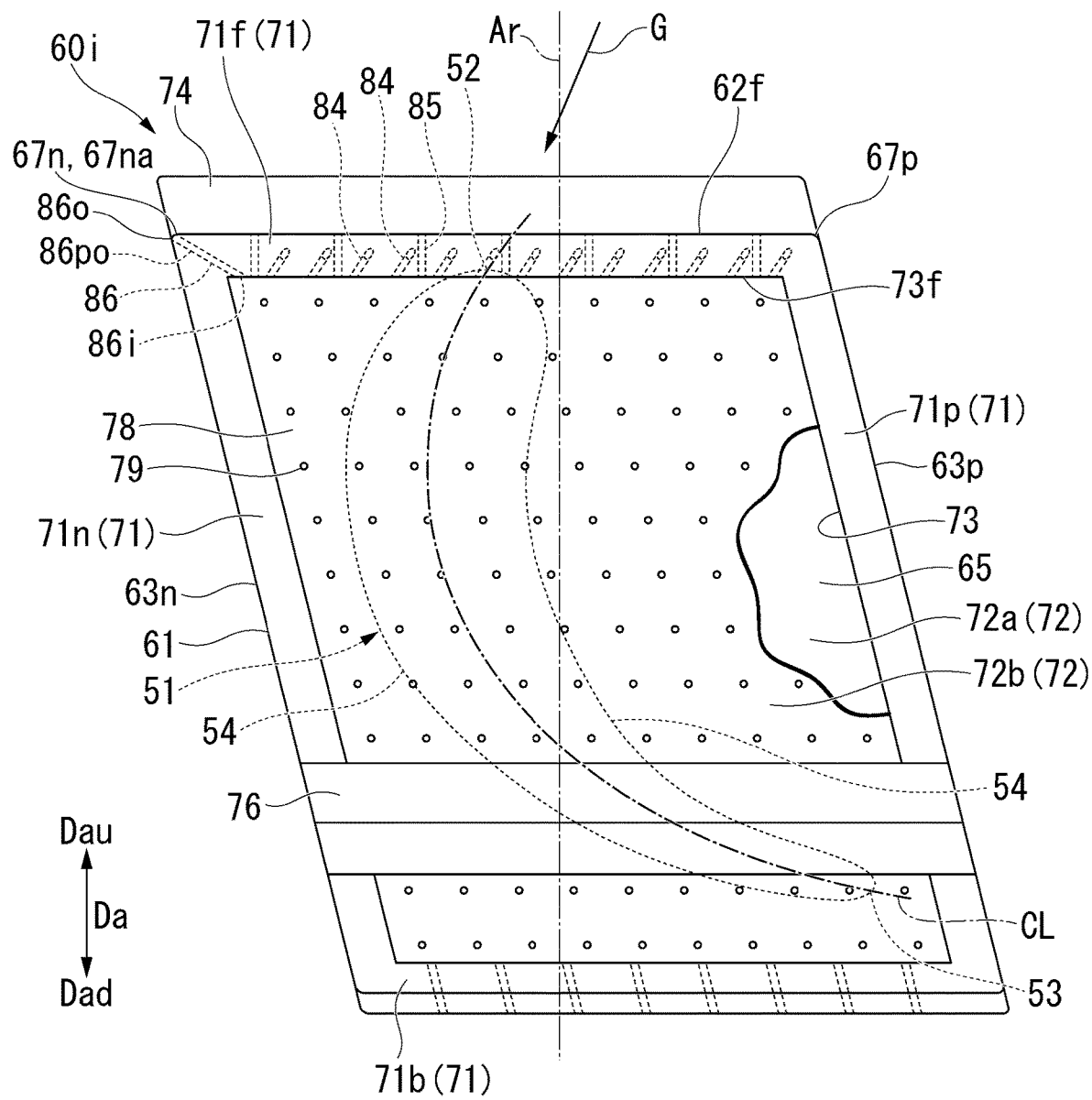
FIG. 9 is a bottom view of a turbine vane of a modified example of the embodiment according to the present invention.

The number of the first air passages 84 may not be the same as the number of the second air passages 85. For example, as shown in FIG. 9, the number of the first air passages 84 may be larger than the number of the second air passages 85. In contrast, the number of the second air passages 85 may be larger than the number of the first air passages 84. Thus, the plurality of first air passages 84 and the plurality of second air passages 85 may not be alternately arranged in the circumferential direction Dc.

Further, the total passage cross-sectional area of the first air passage 84 and the total passage cross-sectional area of the second air passage 85 may not be the same. For example, the passage cross-sectional area of the first air passage 84 may be larger than the passage cross-sectional area of the second air passage 85.

The first outlet 84o of the first air passage 84 may not be disposed in the entire area excluding the end on the circumferential pressure side Dcp and the end on the circumferential suction side Dcn in the front end corner portion 66 of the inner shroud 60i.

Further, the second outlet 85o of the second air passage 85 may not be disposed in the entire area excluding the end on the circumferential pressure side Dcp and the end on the circumferential suction side Dcn in the front end surface 62f of the inner shroud 60i. As described above, the combustion gas G easily flows into the gap space S from the portion on the circumferential pressure side Dcp in relation to the portion on the circumferential suction side Dcn with reference to the leading edge 52 of the blade body 51 in the rear end surface 36b of the transition piece 35 and the front end surface 62f of the inner shroud 60i. Therefore, the first outlet 84o of the first air passage 84 may be disposed, for example, only on the circumferential pressure side Dcp with reference to the leading edge 52 of the blade body 51 in the front end corner portion 66. Further, the second outlet 85o of the second air passage 85 may be disposed only on the circumferential pressure side Dcp with reference to the leading edge 52 of the blade body 51 in the front end surface 62f. Specifically, for example, the first outlet 84o of the first air passage 84 may be disposed only on the circumferential pressure side Dcp with reference to the leading edge 52 of the blade body 51 in the front end corner portion 66 and the second outlet 85o of the second air passage 85 may not be disposed in the entire area excluding the end on the circumferential pressure side Dcp and the end on the circumferential suction side Dcn in the front end surface 62f. In contrast, the first outlet 84o of the first air passage 84 may be disposed in the entire area excluding the end on the circumferential pressure side Dcp and the end on the circumferential suction side Dcn in the front end corner portion 66 and the second outlet 85o of the second air passage 85 may be disposed only on the circumferential pressure side Dcp with reference to the leading edge 52 of the blade body 51 in the front end surface 62f.

Although it is repeated, the first air passage 84 and the second air passage 85 may be formed in the outer shroud 60o instead of the fourth air passage 87. Further, the third air passage 86 may be formed in this outer shroud 60o.

INDUSTRIAL APPLICABILITY

According to an aspect of the present invention, it is possible to effectively cool a turbine vane and to suppress a usage amount of cooling air while improving durability.

REFERENCE SIGNS LIST

10 Gas turbine
11 Gas turbine rotor
15 Gas turbine casing
16 Intermediate casing
20 Compressor
21 Compressor rotor
22 Rotor shaft
23 Turbine blade row
23a Turbine blade
25 Compressor casing
26 Stator blade row
26a Stator blade
30 Combustor
31 Burner
32 Burner frame
33 Combustor basket (or combustor liner)
35 Transition piece
36 Cylinder
36b Rear end surface
37 Flange
40 Turbine
41 Turbine rotor
42 Rotor shaft
43 Turbine blade row
43a Turbine blade
45 Turbine casing
45a Outer casing
45b Inner casing
45c Ring segment
45p Cooling air passage
46 Stator blade row
46a Stator blade
49 Combustion gas flow path
50 Stator blade
51 Blade body
52 Leading edge
53 Trailing edge
54 Suction side
55 Pressure side
60o Outer shroud
60i Inner shroud
61 Shroud main body
62f Front end surface
62b Rear end surface
63n Suction side end surface
63p Pressure side end surface
64 Gas path surface
65 Anti-gas path surface
66 Front end corner portion
66a Front end slope
67p Front end pressure side corner portion
67n Front end suction side corner portion
67na Front end suction side slope
71 Peripheral wall 71f Front peripheral wall
71b Rear peripheral wall
71n Suction side peripheral wall
71p Pressure side peripheral wall
72 Cavity
72a First side cavity
72b Second side cavity
73 Cavity defining surface
73f Front cavity defining surface
74 Upstream protrusion
76 Retainer
78 Collision plate
79 Through-hole
81 Blade air passage
82 Blade profile ejection path
83 Rear end passage
84 First air passage
84i First inlet
84o First outlet
84po First outlet side portion
85 Second air passage
85i Second inlet
85o Second outlet
85po Second outlet side portion
86 Third air passage
86i Third inlet
86o Third outlet
86po Third outlet side portion
87 Fourth air passage
87i Fourth inlet
87o Fourth outlet
90 Outlet seal
90i Inner outlet seal
90o Outer outlet seal
91 Main plate
92a First downstream plate
92b Second downstream plate
93a First upstream plate
93b Second upstream plate
94 Transition piece connection portion
95 Stator blade connection portion
96 Cooling air passage
A Air
Ac Cooling air
F Fuel
G Combustion gas
Ar Axis
Ca Combustor axis
S Gap space
S1 First gap
S2 Second gap
Da Axis direction
Dau Axis upstream side
Dad Axis downstream side
Dc Circumferential direction
Dcp Circumferential pressure side
Dcn Circumferential suction side
Dr Radial direction
Dri Radial inside
Dro Radial outside
Dh Blade height direction
Dh1 First height-direction side
Dh2 Second height-direction side
Ds Lateral direction
Ds1 First lateral side
Ds2 Second lateral side

The invention claimed is:

1. A turbine vane comprising:
a blade body which forms a blade profile, the blade body having a first end facing in a first height direction of the blade body and a second end facing in a second height direction of the blade body, the first height direction and the second height direction being opposite directions; and
a shroud which is provided at the second end of the blade body,
wherein the shroud includes:
a gas path surface which faces toward the first height direction and is in contact with a combustion gas,
a rear end surface which is directed toward an existing side of a trailing edge with respect to a leading edge of the blade body and a downstream side in a flow of the combustion gas and is located on the downstream side in relation to the blade body,
a front end surface which is directed toward an upstream side opposite to the downstream side and is located on the upstream side in relation to the blade body,
a pressure side end surface which connects the front end surface and the rear end surface and in which a pressure side of the blade body exists with reference to a camber line of the blade body, the pressure side end surface being located on the pressure side in relation to the blade body,
a suction side end surface which connects the front end surface and the rear end surface and in which a suction side of the blade body exists with reference to the camber line of the blade body, the suction side end surface being located on the suction side in relation to the blade body,
a front end corner portion which is a corner portion between the gas path surface and the front end surface,
a cavity defining surface which is formed in a region surrounded by the front end surface, the rear end surface, the pressure side end surface, and the suction side end surface, and defines a cavity into which a cooling air flows,
a first air passage in which the cooling air flows, and
a second air passage in which the cooling air flows,
wherein the first air passage includes a first inlet opened at the cavity defining surface and a first outlet opened at the front end corner portion,
wherein the second air passage includes a second inlet opened at the cavity defining surface and a second outlet opened at the front end surface,
wherein the first inlet is positioned farther in the second height direction than a position of the second inlet in the second height direction, and
wherein the pressure side end surface and the suction side end surface are arranged on opposite sides of the shroud with respect to a lateral direction, and the first air passage and the second air passage cross each other when viewed in the lateral direction.

2. The turbine vane according to claim 1,
wherein the shroud includes a plurality of the first air passages and a plurality of the second air passages, and
wherein the plurality of first air passages and the plurality of second air passages are all arranged in the lateral direction.

3. The turbine vane according to claim 2,
wherein a first lateral region extends laterally from the leading edge of the blade body to the pressure side end surface, and a second lateral region extends laterally from the leading edge of the blade body to the suction side end surface, such that the first and second lateral regions are on opposite sides of the leading edge of the blade body with respect to the lateral direction, wherein the first outlets of at least a part of the first air passages in the plurality of first air passages are located in the front end corner portion within the first lateral region, and wherein the second outlets of a portion of the second air passages in the plurality of the second air passages are located in the front end surface within the first lateral region.

4. The turbine vane according to claim 3,
wherein the second outlets of the second air passages other than the portion of the second air passages in the plurality of second air passages are located in the front end surface within the second lateral region.

5. The turbine vane according to claim 2,
wherein at least a part of the first air passages in the plurality of first air passages are adjacent to any second air passage in the plurality of second air passages in the lateral direction.

6. The turbine vane according to claim 2,
wherein the number of first air passages in the plurality of first air passages is larger than the number of second air passages in the plurality of second air passages.

7. The turbine vane according to claim 2,
wherein each first air passage of the plurality of first air passages includes a first outlet side portion including the first outlet in the first air passage, and wherein at least the first outlet side portion in each first air passage of the plurality of first air passages is gradually inclined to be directed toward the first height direction as the first outlet side portion goes toward the upstream side.

8. The turbine vane according to claim 7,
wherein the first outlet side portion of each first air passage of the plurality of first air passages is inclined to be gradually directed toward a first lateral side corresponding to a first side of the lateral direction as the first outlet side portion goes toward the upstream side, and wherein the first lateral side is a side in which the pressure side end surface is located relative to the leading edge of the blade body.

9. The turbine vane according to claim 2,
wherein the number of second air passages in the plurality of second air passages is larger than the number of first air passages in the plurality of first air passages.

10. The turbine vane according to claim 1,
wherein the front end corner portion includes a front end slope which is inclined with respect to each of the gas path surface and the front end surface, and wherein the first outlet is opened at the front end slope.

11. The turbine vane according to claim 1,
wherein the second air passage includes a second outlet side portion including the second outlet in the second air passage, and wherein at least the second outlet side portion of the second air passage is gradually inclined to be directed toward the first height direction as the second outlet side portion goes toward the upstream side.

12. The turbine vane according to claim 1, further comprising:
a collision plate which divides the cavity into a first side cavity on a side of the collision plate that faces the first height direction and a second side cavity on a side of the collision plate that faces the second height direction, wherein the collision plate is provided with a plurality of through-holes which penetrate in a blade height direction and leads the cooling air in the second side cavity into the first side cavity, and wherein at least one inlet of the first inlet and the second inlet is opened at a surface that defines the second side cavity in the cavity defining surface.

13. The turbine vane according to claim 12,
wherein both the first inlet and the second inlet are opened at the surface that defines the second side cavity in the cavity defining surface.

14. The turbine vane according to claim 1,
wherein the shroud includes a front end suction side corner portion which is a corner portion between the gas path surface, the front end surface, and the suction side end surface, and includes a third air passage in which the cooling air flows, and wherein the third air passage includes a third inlet which is opened at the cavity defining surface and a third outlet which is opened at the front end suction side corner portion.

15. The turbine vane according to claim 14,
wherein the front end suction side corner portion includes a front end suction side slope which is inclined with respect to each of the gas path surface, the front end surface, and the suction side end surface, and wherein the third outlet is opened at the front end suction side slope.

16. A gas turbine comprising:
a plurality of the turbine vanes according to claim 1;
a turbine rotor which rotates about an axis;
a turbine casing which covers the turbine rotor; and
a combustor which sends the combustion gas into the turbine casing from an axis upstream side in an axis direction in which the axis extends, wherein the plurality of turbine vanes are arranged in the turbine casing, wherein the turbine rotor includes a rotor shaft which is centered on the axis and a plurality of turbine blades which are attached to the rotor shaft, wherein the plurality of turbine blades are arranged in a circumferential direction with respect to the axis, and wherein the plurality of turbine vanes are arranged in the circumferential direction, located on the axis upstream side in relation to the plurality of turbine blades, and are attached to the turbine casing so that a blade height direction is a radial direction with respect to the axis and the upstream side is the axis upstream side.

17. The gas turbine according to claim 16,
wherein the second height direction faces radially inward with respect to the axis, and wherein the shroud is an inner shroud which is provided at an end of the blade body on the radial inside.

18. The gas turbine according to claim 16, further comprising:
a seal which connects the combustor and at least one turbine vane of the plurality of turbine vanes, wherein the combustor includes a burner which injects fuel in a direction including a directional component on an axis downstream side opposite to the axis upstream side in the axis direction and a transition piece which is formed in a cylindrical shape and forms a combustion space for burning the fuel injected from the burner, wherein the transition piece includes a cylinder which extends in the direction including the directional component on the axis downstream side and forms the combustion space on an inner peripheral side and a flange which protrudes toward an outer peripheral side from a downstream end of the cylinder on the axis downstream side, wherein the shroud of the at least one turbine vane includes an upstream protrusion which protrudes toward the upstream side from a position separated from the gas path surface in the front end surface, wherein the seal is located on the outer peripheral side in relation to an outer peripheral surface of the cylinder and the downstream end of the cylinder and the front end surface of the shroud face each other with a gap therebetween, wherein the seal includes a transition piece connection portion which is connected to the flange of the transition piece, a turbine vane connection portion which is connected to the upstream protrusion of the at least one turbine vane, and a cooling air passage in which the cooling air flows, and wherein the cooling air passage of the seal allows a space between the downstream end of the cylinder and the front end surface of the shroud to communicate with a space on the outer peripheral side of the transition piece.

\* \* \* \* \*